United States Patent [19]
Follmer et al.

[11] Patent Number: 5,255,756
[45] Date of Patent: Oct. 26, 1993

[54] CADDY WITH GUIDANCE SYSTEM FOR AGRICULTURAL IMPLEMENTS

[75] Inventors: Richard L. Follmer, Hudson; Donald L. O'Neall, Downs, both of Ill.

[73] Assignee: Progressive Farm Products, Inc., Hudson, Ill.

[21] Appl. No.: 872,581

[22] Filed: Apr. 22, 1992

[51] Int. Cl.$^5$ .......................... A01B 69/06; B62D 5/09
[52] U.S. Cl. .......................... 180/131; 172/6; 280/412; 180/906
[58] Field of Search .................. 180/79, 131, 906; 280/411.1, 776, 474, 476.1, 412; 172/5, 6, 26, 233; 104/244.1

[56] References Cited

U.S. PATENT DOCUMENTS

| | | | |
|---|---|---|---|
| 2,610,562 | 9/1952 | Ward | 172/5 X |
| 3,326,319 | 6/1967 | Schmidt | 180/131 |
| 3,419,284 | 12/1968 | Tibbals | 280/412 |
| 3,795,285 | 3/1974 | Scholl et al. | 180/79.2 B |
| 4,184,551 | 1/1980 | Orthman | 172/26 |
| 4,228,860 | 10/1980 | Orthman | 172/26 |
| 4,463,811 | 8/1984 | Winter | 172/26 |
| 4,607,716 | 8/1986 | Beck | 180/131 |
| 4,640,365 | 2/1987 | Schmidt | 172/26 |
| 4,930,581 | 6/1990 | Fleischer et al. | 172/6 |
| 5,025,866 | 6/1991 | Schmidt et al. | 180/131 X |
| 5,031,704 | 7/1991 | Fleischer et al. | 172/6 |
| 5,039,129 | 8/1991 | Balmer | 180/906 X |
| 5,094,300 | 3/1992 | Jurgena | 172/5 |

FOREIGN PATENT DOCUMENTS

| | | | |
|---|---|---|---|
| 0055168 | 4/1967 | Fed. Rep. of Germany | 172/5 |
| 2044593 | 10/1980 | United Kingdom | 172/5 |

OTHER PUBLICATIONS

Buffalo Scout Brochure.
Orthman, MP III Tracker Brochure.
Orthman, Drawn Rowcrop Cultivator Brochure.
Sukup Auto Guide Guidance System Brochure.
Sunco, Acura Trak Model T/T Brochure.
Lincoln Creek Manufacturing, The Guide, Quick Hitch Brochure.

*Primary Examiner*—Margaret A. Focarino
*Assistant Examiner*—Peter C. English
*Attorney, Agent, or Firm*—Lockwood, Alex, FitzGibbon & Cummings

[57] ABSTRACT

A caddy with a guidance system for towing agricultural implements is provided for row crop farming. The caddy converts mounted agricultural implements to pull-type implements, allowing larger implements to be pulled by relatively small tractors. A guidance system automatically maintains the desired position of the implement and the caddy with respect to the crop rows. The frame assembly of the caddy includes a tongue assembly for attachment to a tractor. The tongue is pivotally connected to an axle which is rotatable about a vertical axis at the rear of the caddy. A three-point hitch is provided in association with the axle of the caddy for attachment to a mounted implement. The guidance system of the invention is provided as a sensor-activated hydraulic mechanism having at least one hydraulic cylinder to rotate the axle about the vertical axis to steer the caddy and provide the necessary correction to its path of travel.

20 Claims, 7 Drawing Sheets

CADDY WITH GUIDANCE SYSTEM FOR AGRICULTURAL IMPLEMENTS

BACKGROUND AND BRIEF DESCRIPTION OF THE INVENTION

This invention relates to devices for use with agricultural implements. More specifically, the invention relates to a caddy equipped with a guidance system for towing agricultural implements used in row crop farming. The tractor drawn caddy converts mounted implements to pull-type and the related guidance system automatically corrects the path of travel for the caddy to prevent the wheels on the caddy and the ground-engaging attachments on the implement from drifting away from their preferred positions between the rows of crop. The invention offers both a technological advantage to the farmer/user as well as a significant reduction in overall equipment costs.

Many agricultural implements such as cultivators, planters and the like are built to be pulled by a tractor. Such implements are bulky, requiring some mechanism to prevent the ground-engaging attachments of the implement from drifting significantly from their preferred position between the rows of crop. As is known to those skilled in the art, some correction is provided by the use of a three-point hitch wherein the two diverging draft links provide a limited degree of self-correction for the problem of implement drift. However, the conventional three-point hitch still allows implement drifting to occur, and has failed to completely prevent the implement attachments from drifting into the individual crop rows. Notwithstanding the use of the three-point hitch, crop damage can occur when the tractor operator inadvertently steers into the crop, for example, with the implement following therebehind. Moreover, the operation of the aforementioned equipment on hilly terrain, such as on side hills, makes the problem of crop damage more serious since both the tractor and the implement tend to slide downhill, requiring a highly skilled tractor driver to compensate by steering the tractor slightly uphill so that the tractor and the attached implement move forward on a slight skew. These and other problems have made the three-point hitch less than satisfactory for controlling implement drifting in row-crop farming.

For more enhanced control, electronic guidance systems have been developed and typically include at least one sensor mechanism to detect the position of the implement relative to the crop rows. Any deviation from the desired lateral position of the implement relative to the rows of crop is detected and a steering mechanism is activated to reset the path of travel in an attempt to maintain the implement attachments between the rows of the crop. These guidance systems can be passive or can operate automatically and offer an additional means for correcting implement drift during field operations. Yet, these guidance systems, while providing some advantages over the three point hitch in correcting implement drifting, have generally been unsatisfactory in their operation. Moreover, these systems have generally been expensive and compatible only with larger (and more expensive) equipment such as more powerful tractors (e.g. 175 horsepower). Consequently, the guidance systems of the prior art have failed to effect any reduction in overall equipment costs and, while providing some drift-correcting ability, have been less than satisfactory in those applications where implement drift becomes more severe, such as on hills or uneven terrain and especially on side hills with slopes of about 20% (20 feet of rise for every 100 feet travelled).

In light of the shortcoming and limitations of the prior art, it is desirable to provide a guidance control system to automatically control the positioning of an implement within the rows of a crop, allowing the farmer or tractor operator to concentrate on his or her driving without constantly having to visually monitor the position of the implement within the rows. It is also desirable to provide such a guidance system along with a device which will effectively convert a larger implement such as a sixteen-row cultivator, for example, from a mounted implement to a pull-type implement, allowing the farmer to use a smaller tractor (e.g. 60 horsepower) and thereby providing a significant reduction in equipment costs. Most preferably, such a device should be capable of steering a towed implement in a manner that is at least partially independent of the position of the tractor and which will operate with improved steering abilities on rough, uneven and hilly terrain.

The present invention provides such a desired apparatus and overcomes the aforementioned limitations of the prior art by providing a caddy to convert mounted implements to pull-type, allowing larger implements to be pulled by smaller tractors while simultaneously providing a guidance system therewith to maintain the ground-engaging attachments associated with the implement between the crop rows. The apparatus of the present invention includes a caddy which can be pivotally attached to a tractor. The caddy includes a frame assembly and a load-carrying axle mounted for rotation about a vertical axis at the rear of the caddy. A three-point hitch is provided in association with the rear axle for attachment to a mounted implement. A guidance system is provided as a sensor-activated hydraulic mechanism wherein two opposed hydraulic cylinders are mounted along the frame of the caddy and attached to the rear axle thereof to displace the axle by a pivoting action about the aforementioned vertical axis and thereby steer the caddy to maintain the implement in a desired lateral position with respect to the crop rows.

The sensor assembly of the guidance system includes a pair of sensing wands extending down from the frame of the caddy so that each wand is positioned along the adjacent row of crop when the implement tools are positioned appropriately within the center of the row. The wands are connected to a first sensor. If the implement begins to drift significantly from its desired position within the rows, one of the sensor wands will engage the adjacent row of crop more solidly than the opposite wand and this deviation will be translated into an electrical signal picked up by the first sensor. The sensor will then actuate a hydraulic circuit to rotate the rear axle and the implement about the vertical axis in a direction away from the crop row which was engaged by the wand, turning the rear axle of the caddy toward the center of the crop row.

A second or feedback sensor is also provided to generate a signal when the rear axle is rotated to make the above-discussed correction. The feedback sensor will actuate the hydraulic cylinders again when the implement is returned to the desired path and rotate the axle back to a transverse position relative to both the crop rows and the direction of travel.

It is accordingly an object of the present invention to provide a device that can be used in row crop farming with conventional row crop implements.

It is also an object of the present invention to provide a caddy with a guidance system which allows for the conversion of mounted implements into pull-type implements and wherein the guidance system of the invention automatically corrects the position of the caddy and implement to maintain a desired position in the crop rows.

Other objects, features and advantages of the present invention will be apparent to those skilled in the art upon consideration of the remainder of the disclosure.

DETAILED DESCRIPTION OF THE PREFERRED EMBODIMENT

The present invention provides a caddy and guidance system for converting mounted agricultural implements into pull-type implements wherein a guidance system automatically positions the caddy and the attached implement within a preferred position relative to the rows of crop when towed behind a tractor. In discussing the aforementioned caddy and guidance system herein, reference will be made to the drawings wherein like reference numerals indicate like elements.

Referring to the Figures, the caddy 10 is depicted in tow behind a tractor 12. An agricultural implement 14 is attached to the rearmost portion of the caddy 10 in a manner to be described herein. The tongue 18 of the caddy 10 is attached to the tractor by a pivot hitch 16 in a conventional manner. The tongue 18 extends back from the tractor and over a frame 20 having cross members 22 and 24 and side members 26 and 28. The tongue 18 is positioned over the uppermost surfaces of the cross members 22 and 24 so that the tongue can move laterally above the surface of the frame 20 without obstruction from the cross-members.

The tongue 18 extends back from the pivot hitch 16 over the frame 20 to connect with rear axle 30 by pivot pin connection 32. The pivot pin connection 32 allows the rear axle 30 to pivot about vertical axis a—a(FIG. 4) to steer both the caddy 10 and the attached implement 14 and to thereby maintain both the caddy and the implement in a desired position with respect to the rows of crop (represented by broken lines in FIGS. 2-3). The pivot pin connection 32 includes a C-shaped mounting bracket extending from the rear axle 30 having upper and lower flanges 34 and 36, respectively, welded to the upper and lower surfaces of the axle sleeve 58 and extending forwardly from the axle to receive the rearmost portion of the tongue 18. The flanges 34, 36 include vertically aligned apertures and the upper flange 34 is preferably provided with a collar 38 extending upwardly from the upper surface of the flange 34 and surrounding the aforementioned aperture. The rearmost end of tongue 18 fits within the C-shaped bracket formed by upper and lower flanges 34, 36 and the portion of the tongue 18 received therein is provided with vertically aligned apertures in the upper and lower surfaces thereof for alignment with the apertures in the flanges 34 and 36. Pivot pin 40 is received within the apertures of the flanges 34, 36 and the tongue 18 to pivotally connect the tongue with frame 20 and rear axle 30. The pivot pin 40 is retained within the apertures of the upper and lower flanges 34, 36 and the tongue 18 by a remaining bolt (not shown) extending through both the collar 38 and the uppermost portion of pivot pin 40.

The tongue 18 includes two distinguishable portions 44 and 46. The rear tongue portion 46 is positioned to extend horizontally over the cross members 22, 24 of the frame 20 and will preferably extend a short distance forward of the cross member 22. The rear portion 46 is connected to the forward portion 44 of the tongue 18 at an angled junction 48 by welding, for example. In this arrangement, the tongue is dimensioned to compensate for the height of the frame 20 and, in particular, the height of the rear tongue portion 46 when positioned over the frame. The forward tongue 44 extends down from the rear portion 46 at a predetermined angle to compensate for the height of the rear portion 46 and to thereby permit the tongue 18 to be connected to the standard hitch of the tractor 12.

The rear axle 30 of the caddy 10 is preferably adjustable to accommodate different row widths for different crops. Such adjustability is accomplished with a 3-piece construction including a central sleeve 58 and side shanks 60, 62. The shanks are identically dimensioned and constructed with one end adapted to be received within an open end of the sleeve 58. The opposite end of each of the shanks 60, 62 are L-shaped with downwardly extending vertical portions 64, 66 which are suitably equipped for mounting tires 50, 52 thereon in a conventional manner Each of the side shanks 60, 62 can be inserted within the axle sleeve 58 and retained therein to set the axle width and thereby accommodate the row width of the particular crop. Preferably, the side shanks, 60, 62 are provided with at least two sets of predrilled horizontally aligned apertures which can be aligned with similarly dimensioned and aligned apertures within the axle sleeve 58. When the apertures on each of the shanks are aligned with corresponding apertures on the sleeve, a locking bolt can be inserted through the sleeve 58 and the shank 60, 62 to set the width for the axle as needed for the particular crop in which the caddy 10 is being used.

Figure 7:
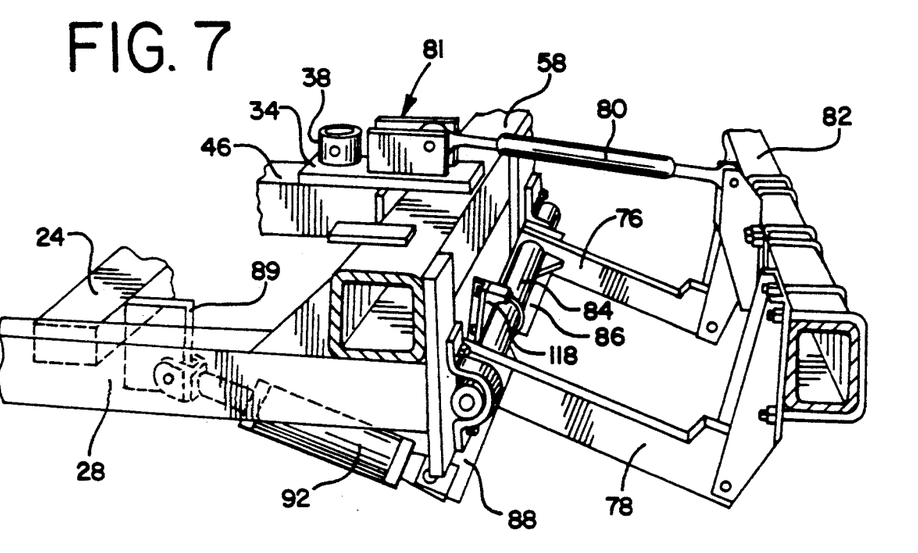
FIG. 7 is a perspective view, in section, of the invention and showing a three-point hitch assembly.

The caddy 10 is equipped with a three-point hitch associated with the axle 30. The hitch, shown in FIGS. 5 and 7, includes laterally aligned right and left draft links 76, 78 and a center link 80 positioned between and above the draft links. In the preferred embodiment, the center link of the hitch assembly is provided as a conventional turnbuckle to maintain a desired predetermined distance between its attachment bracket 81 on the flange 34 positioned over the axle 30 and the tool bar 82 of the implement 14. The right and left draft links 76, 78 are mounted along rod 84 which, in turn, is mounted parallel to the rear face of axle 30 so that the rod 84 extends between side members 26, 28 of the frame 20 just beneath the axle sleeve 58 and parallel thereto. The rod 84 is mounted for rotation about its longitudinal axis to enable the right and left draft links 76 and 78 to lift and to lower the implement 14 under hydraulic control, as discussed herein. Preferably, the draft links 76 and 78 are identically dimensioned and can be attached to the tool bar 82 of the implement 14 in a conventional manner. Rod flange portions 86, 88 are associated with the right and left draft links 76, 78, respectively, and preferably are positioned next to the draft links to form a pair of L-shaped hydraulically actuated hitch arms which raise and lower the implement 14 under hydraulic control. The rod flange portions 86, 88 extend downwardly to provide an attachment point for a pair of hydraulic cylinders 90 and 92 which raise and lower the implement 14.

The hydraulic cylinders 90 and 92 operate in a conventional manner and are preferably attached at one end to each of the rod flange portions 86, 88 and, at the other end, to flanges 87 and 89 affixed to cross-member 24. In this manner, the rods of each of the cylinders 90 and 92 are attached to the rod flange portions 86, 88 while the other ends of the cylinders are affixed to the frame 20 of the caddy 10. The three-point hitch may be hydraulically actuated so that the simultaneous extension of the rods of both of the cylinders 90 and 92 push against the rod flange portions 86, 88 to rotate the hitch rod 84 and thereby lift the right and left draft links 76 and 78. In this manner, the implement 14 can be raised off of the ground when not in use. The release of hydraulic pressure in the cylinders 90, 92 will allow the implement to be lowered to the ground under the force of gravity. The cylinders 90 and 92 are hydraulically connected to one of the standard hydraulic outlets (not shown) on the tractor 12 and are operated in a known manner through the tractor's hydraulic system.

A guidance system is provided to steer the caddy and thereby maintain a desired position for both the caddy and the implement with respect to the crop rows. In this regard, the guidance system is designed to maintain the ground-engaging attachments associated with implement 14 between the rows of crop with rear axle 30 and tool bar 82 positioned laterally over the rows and generally transverse to the direction of travel when the caddy 10 is towed behind the tractor 12. The guidance system automatically corrects the path of travel of the caddy and the attached implement by a sensor-activated hydraulic mechanism which steers the caddy by rotation of the axle 30 around the vertical axis a—a (FIG. 4) to turn the axle relative to tongue 18 in order to correct for any deviation by the caddy 10 from the desired path of travel. As soon as the implement and the caddy 10 begin to drift from the aforementioned lateral position relative to the crop rows, the guidance system will actuate the hydraulic mechanism to turn the axle 30 in the appropriate direction to correct for the aforementioned drift. Once the caddy has been steered back to the desired position within the crop row, the guidance system again will pivot the axle 30 about the pivot pin connection 32 to position the rear axle 30 and the tool bar 82 implement back in the desired lateral position with respect to the crop rows.

The guidance system includes a pair of hydraulic cylinders 94, 96, both of which are positioned on the caddy to extend between an attachment plate 98 positioned on the tongue 18 and attachment plates 100 and 102 affixed to the axle sleeve 58. The attachment plate 98 on the rear tongue portion 46 is large enough for attachments to both of the hydraulic cylinders 94 and 96 and is preferably secured to the tongue by weldment, for example. The axle attachment plates 100 and 102 are positioned laterally along the upper surface of the axle sleeve 58 on either side of center link 80. The cylinders 94 and 96 operate in a complimentary fashion to steer the caddy 10 by pivoting the rear axle 30 about the pivot pin connection 32. For example, in steering the caddy to the left, the rear axle must be rotated about the pivot pin connection 32 by having the right hydraulic cylinder retracted while the left hydraulic cylinder 94 is extended. In this manner, the axle 30 and the attached frame 20 will be turned about the vertical axis a—a (FIG. 4) relative to the tongue 18 to steer the caddy and the attached implement 14 to the left.

Figure 1:
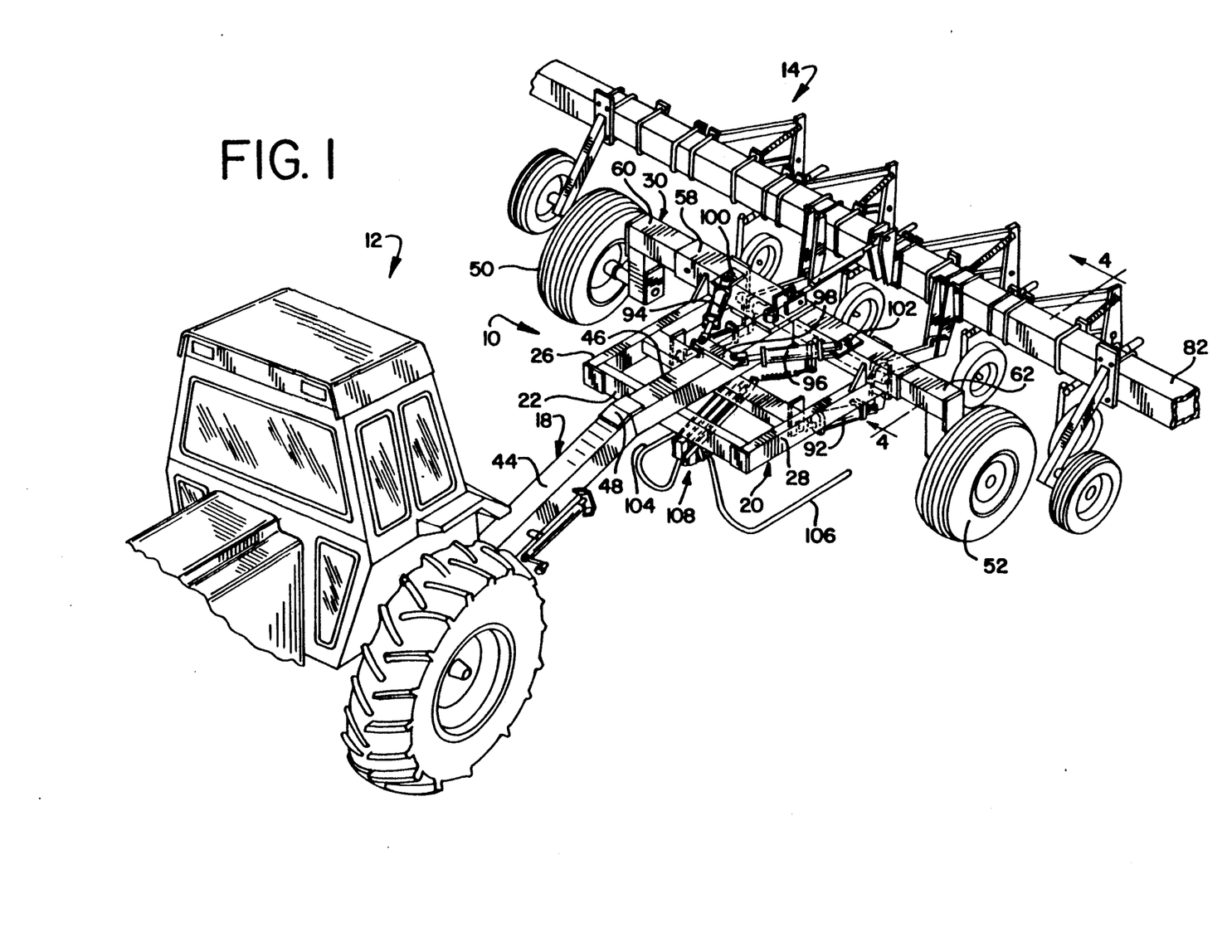
FIG. 1 is a perspective view of the caddy and guidance system of the present invention, shown in tow behind a tractor with an agricultural implement attached thereto.
Figure 2:
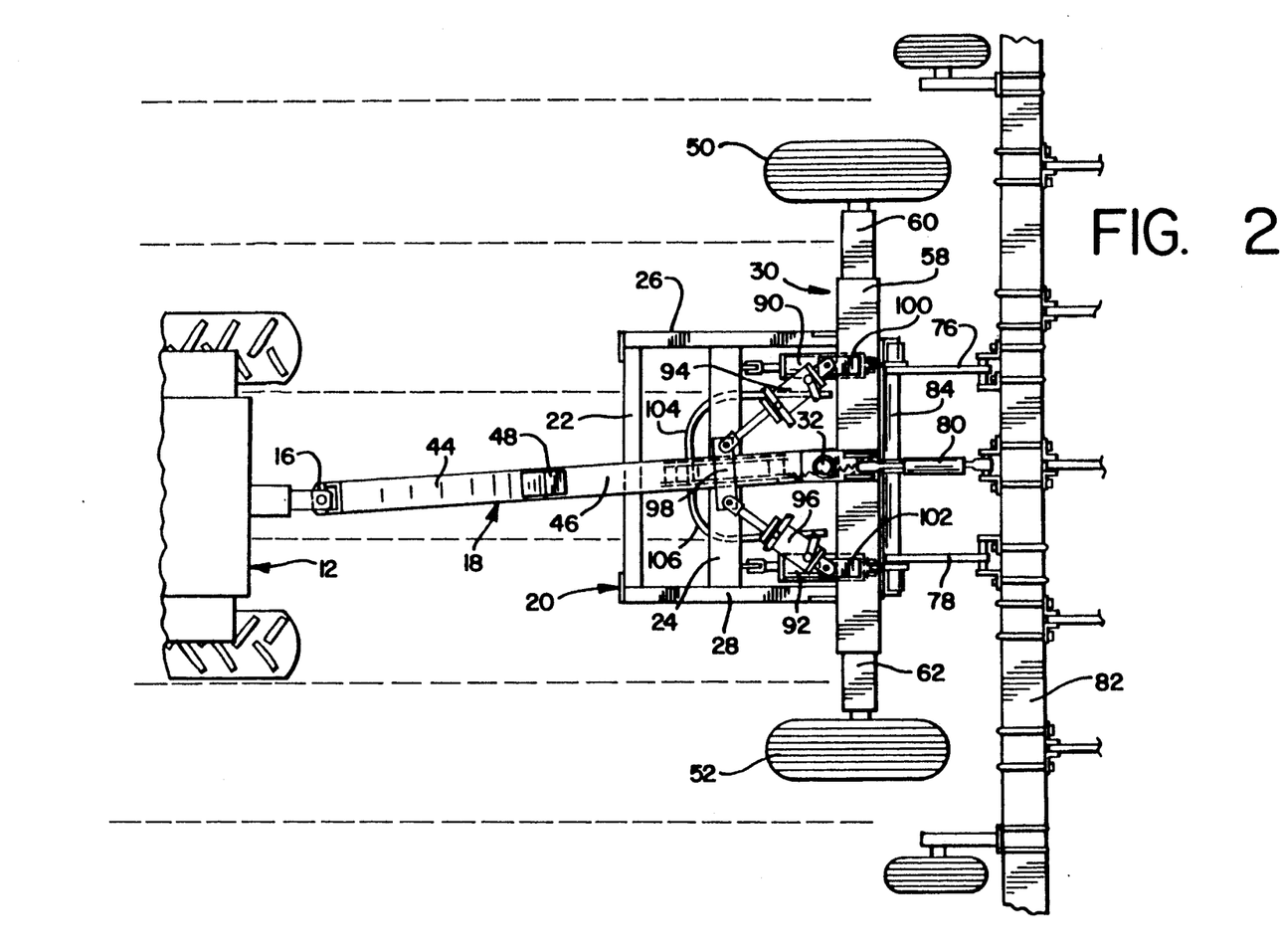
FIG. 2 is a top plan view of the caddy of the invention with the rear axle turned about its vertical axis to steer the caddy to the right relative to the tractor.
Figure 3:
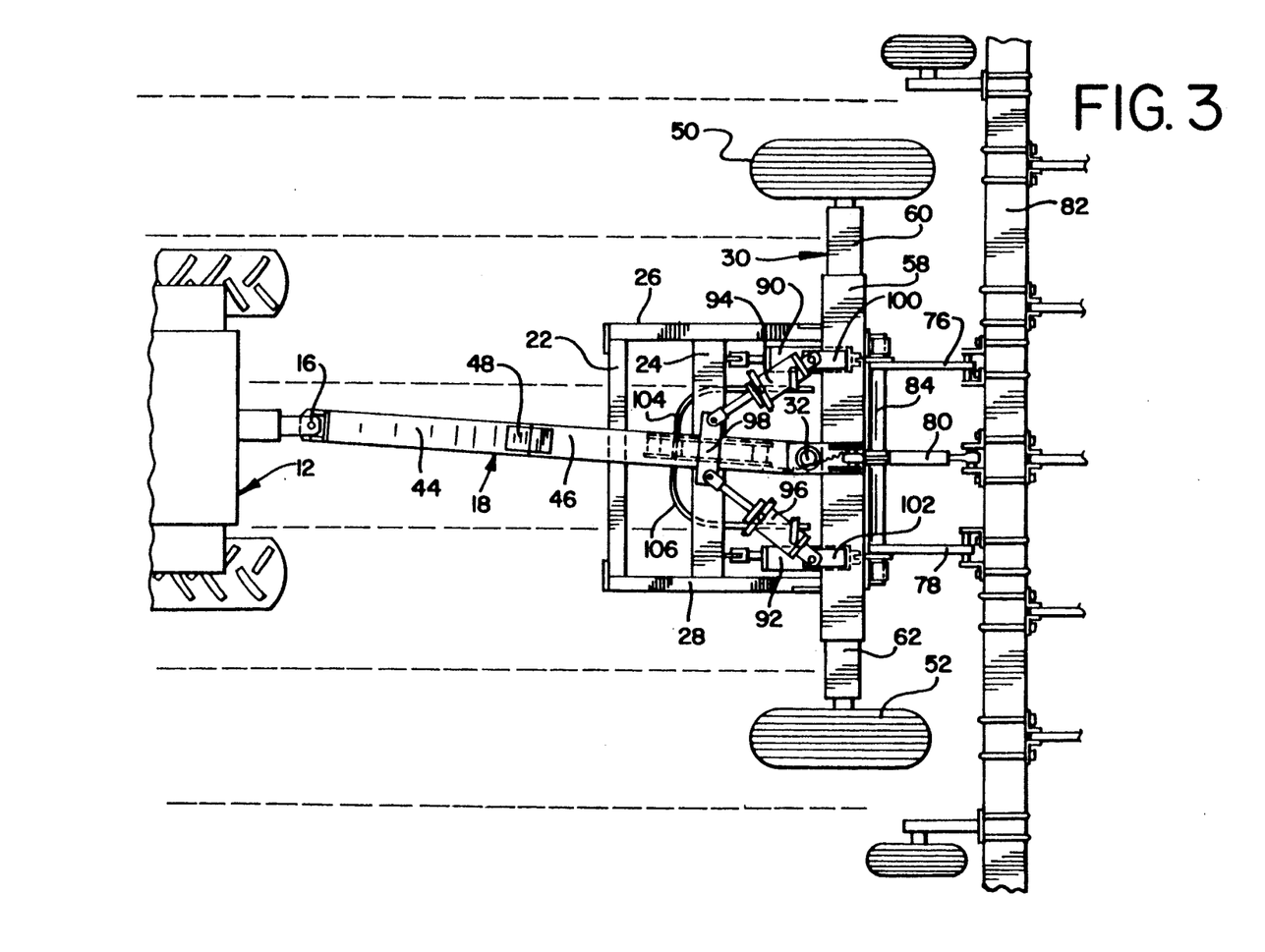
FIG. 3 is a top plan view of the caddy of the invention with the rear axle turned about its vertical axis to steer the caddy, to the left relative to the tractor.
Figure 4:
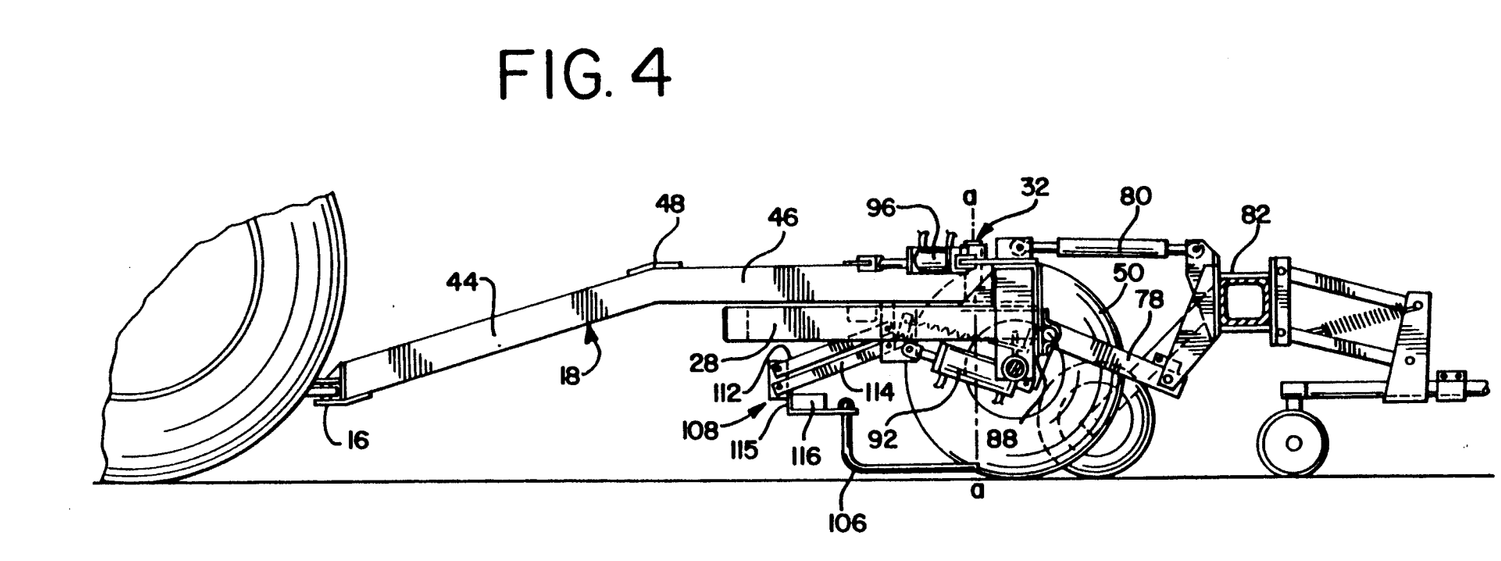
FIG. 4 is a side view taken along the 4—4 line of FIG. 1, of the caddy and guidance system of the invention in tow behind a tractor and pulling an agricultural implement therebehind.

Likewise, the implement may be moved to the right when the right hydraulic cylinder 94 is extended while the left hydraulic cylinder 96 is retracted, rotating the axle 30 and steering the attached implement to the right. Once the caddy 10 has been moved to the desired position within the rows of crop, the cylinders 94 and 96 will re-correct the position of the axle 30 in response to a signal received from the sensor assembly, discussed below. In this manner, the hydraulic cylinder in the extended mode will retract an appropriate amount and the retracted hydraulic cylinder will extend an appropriate amount to correct the position of the axle 30 and frame 20 so that the axle and the tool bar 82 are aligned laterally with respect to the rows of crop even if the tractor has drifted away from a "centered" position within the rows, as illustrated in FIGS. 2 and 3.

Figure 8:
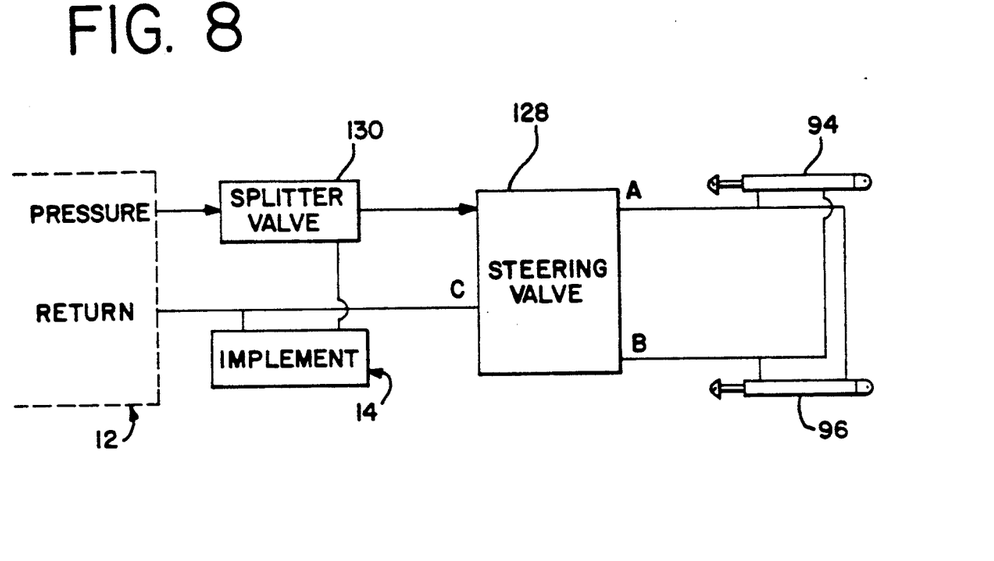
FIG. 8 is a schematic representation of the hydraulic system for steering the caddy of the invention.

The hydraulics of the guidance system are schematically presented in FIG. 8 which will be readily understood by those skilled in the art. A steering valve 128 is mounted on the caddy 10, preferably along the tongue 18. The steering valve 128 is a hydraulic solenoid valve which receives incoming hydraulic fluid from one of the hydraulic outlets on the tractor 12 through a splitter valve 130. The hydraulic fluid from tractor 12 passes through an outlet A of the steering valve 128 and through a hydraulic hose to the rod end of hydraulic cylinder 94 and the cylinder end of hydraulic cylinder 96. The output B of steering valve 128 is connected by a hydraulic hose to the rod end of hydraulic cylinder 96 and the cylinder end of hydraulic cylinder 94. The return input C of the steering valve 128 is connected to the hydraulic return on the tractor 12.

A splitter valve 130 is provided to alternatively utilize the hydraulic pressure from tractor 12 to control the hydraulics associated with the implement 14. In other words, implements such as large cultivators and the like may be equipped with a hydraulic mechanism for raising and lowering the wings of the tool bar 82 as is well known in the art. The splitter valve 130 is employed to selectively direct the tractor's hydraulic fluid between its above-described use in steering the caddy 10 and its alternative function of folding and unfolding the implement 14.

Figure 5:
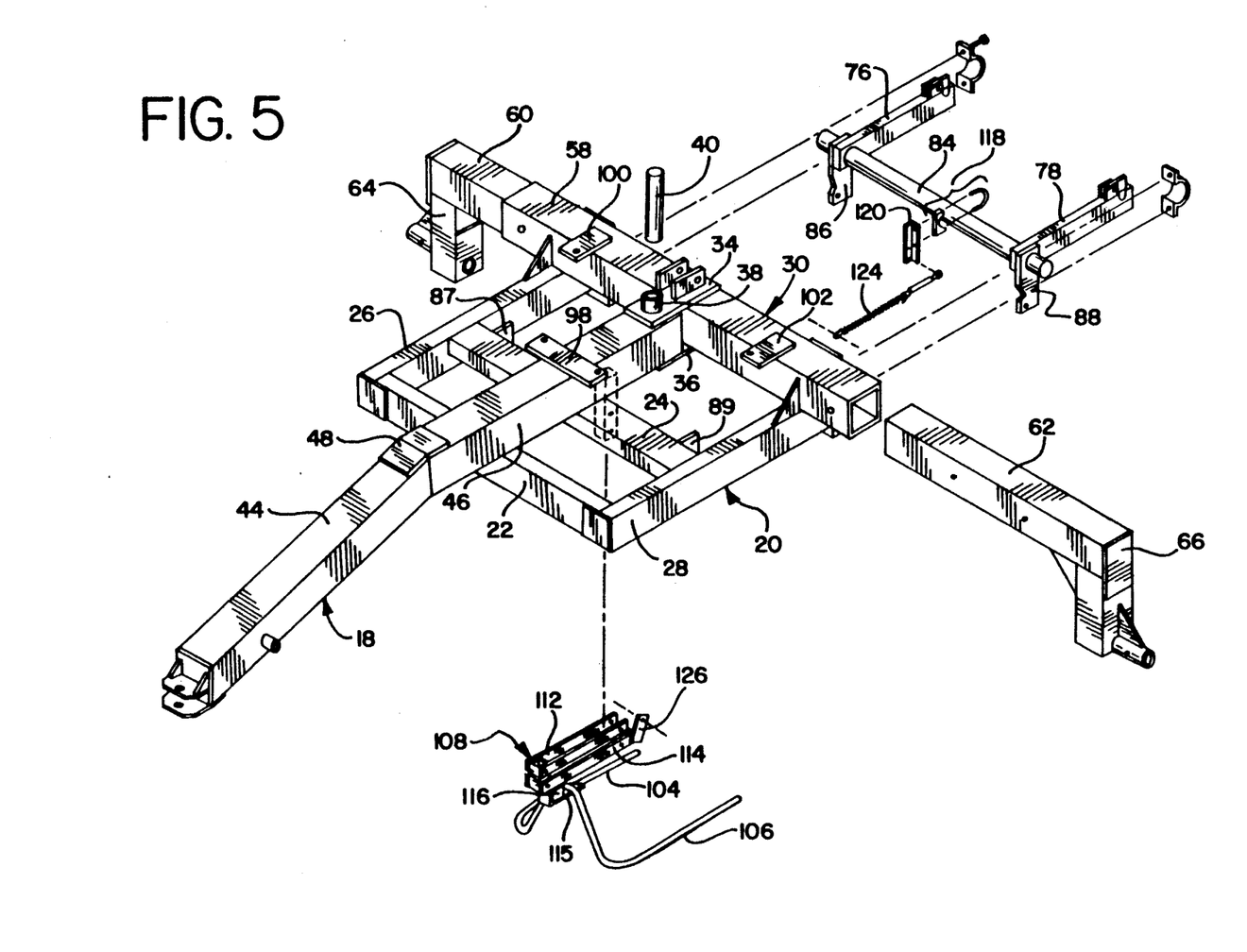
FIG. 5 is a perspective view, partially exploded, of the caddy according to the present invention.
Figure 6:
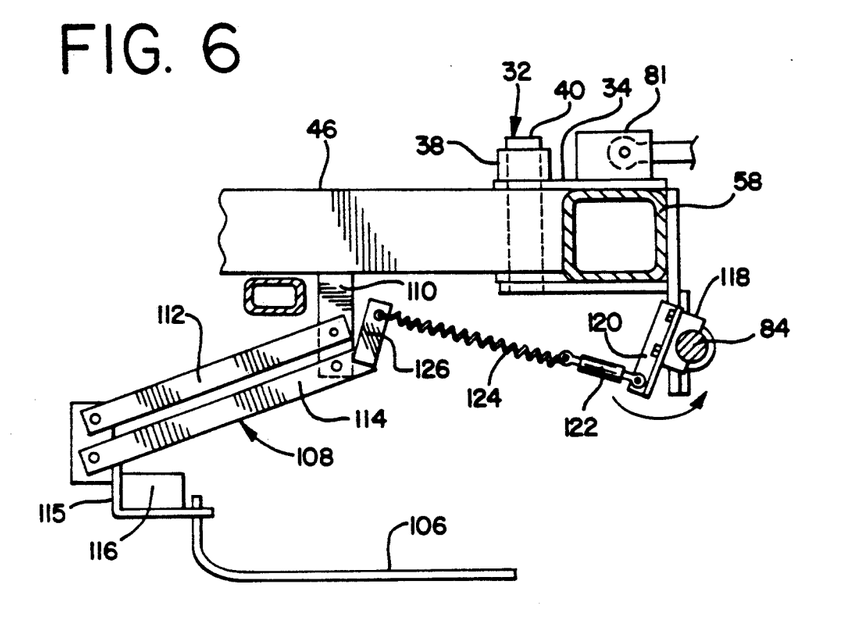
FIG. 6 is an enlarged side view, in section, of the invention and showing the sensor-carrying assembly.

The sensor assembly of the aforementioned guidance system includes a set of sensor wands 104 and 106 mounted on a carriage assembly 108. The carriage assembly is pivotally mounted to the underside of rear tongue portion 46. The assembly can be raised and lowered to disengage and engage the sensor wands 104, 106 with respect to the rows of crop. As shown in FIGS. 5 and 6, the assembly 108 is attached to the underside of the tongue 18 by a downwardly extending clamp 110. Two pairs of pivotally mounted carriage arms 112 and 114 extend from the clamp 110 in parallel relation, carrying the sensor wands 104 and 106 at the opposite end thereof. The arms 112 and 114 extend down and toward the front of the caddy 10 and away from the rear axle 30. The sensor wands and a first or row sensor 116 (discussed below) are carried on a mounting bracket 115 pivotally attached to the ends of the pairs of arms 112 and 114.

The carriage assembly 108 is raised and lowered with the three-point hitch by a mechanical connection between the rod 84 and at least one of the carriage arms 114. In the preferred embodiment, a clamp 118 and an associated flange 120 are affixed to the rod 84 (See FIG. 6) so the clamp and flange will rotate with the rod 84 when the three-point hitch is raised and lowered, as described above. A turnbuckle 122 and a chain 124 extend between the flange 120 and a lift arm 126. The lift arm 126 is rigidly affixed to one of the carriage arms 114, extending above the arm to provide an attachment point to the chain 124. In this arrangement, the chain 124 and turnbuckle 122 provide a connection between the carriage assembly 108 and the rod 84 so that rotation of the rod and the associated clamp 118 will raise or lower the carriage assembly 108 and the associated wands 104 and 106 and row sensor 116. The tension of chain 124 may be adjusted by making the appropriate adjustment to the turnbuckle 122 which is of a conventional design.

With particular reference to FIG. 6, the carriage assembly is depicted in a lowered position which, in operation, would be appropriate whenever the three point hitch and implement 14 were also lowered such as when plowing or cultivating, for example. When the implement and hitch are raised, the rod 84 and clamp 118 will rotate in a counterclockwise direction, as viewed in FIG. 6. In this manner, the flange 120 will pull the turnbuckle 122 and the chain 124 to pull lift arm 126 and thereby raise the carriage assembly 108 to thereby protect the components of the sensor assembly when not in use.

The sensor wands 104, 106 are commercially available and are typically of a fiberglass construction and are designed to feel the inside of adjacent rows of crop. When the caddy is properly positioned within the rows of crop, each of the wands 104, 106 will rub against the adjacent row of crop with approximately equal pressure being exerted on both wands. When the caddy 10 and the associated implement 14 stray from the desired course of travel, the wands will no longer experience equal pressure from the adjacent rows and an excess amount of pressure will be exerted on one of the two wands, depending upon the direction of the stray. This discrepancy in the pressure exerted on the two wands 104, 106 is translated into an electrical signal which is evaluated by the system to determine, first, the direction in which the caddy 10 has deviated from its desired course of travel and, second, to actuate the hydraulic cylinders 94, 96 to pivot the axle 30 about the vertical axis a—a and to thereby steer the caddy 10 in a direction to correct the caddy's path of travel.

The sensor wands are most preferably positioned beneath the caddy 10 to extend back along the adjacent crop rows so that the ends of each of the wands 104, 106 are positioned along the circumference of a circle centered about the vertical axis a—a of the pivot pin connection 32. This geometry has been found to be most important in achieving the degree of control over the caddy 10 necessary to make the minor and continuous adjustments in the caddy's path of travel to avoid damaging the crop with the implement 14. Control must be maintained over the implement's position within the crop rows and the aforementioned geometry is believed to be a key part of the successful use and operation of the present invention.

Figure 9:
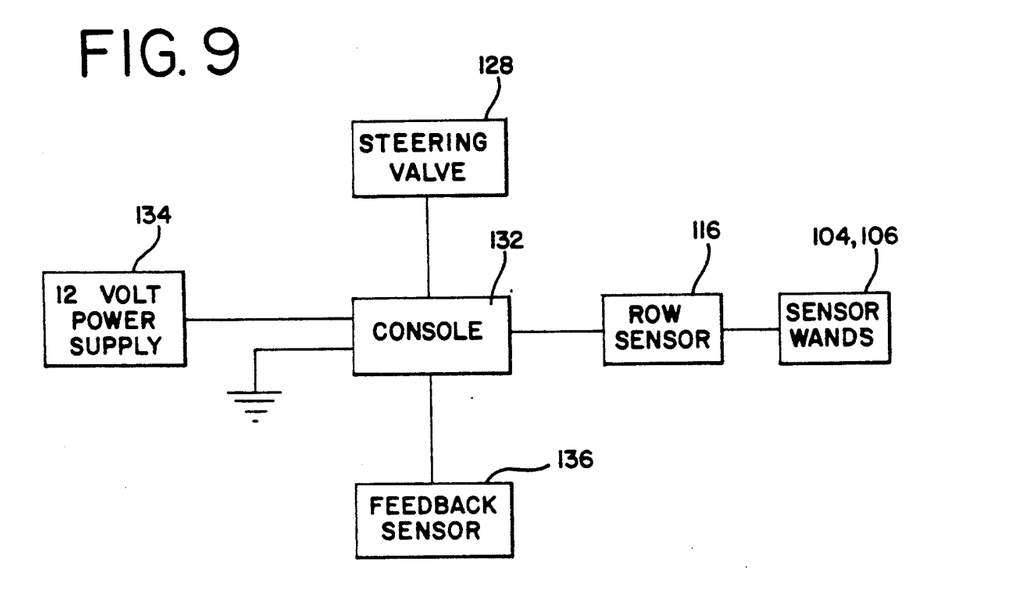
FIG. 9 is a schematic representation of a guidance system for the automatic control of the steering system of the invention.

The sensor assembly is schematically depicted in FIG. 9, illustrating the functional relationship between the components thereof. The sensor assembly is commercially available and is controlled through the console 132 mounted in the cab of tractor 12. The console includes programmed electronics on a printed circuit board (not shown) for the automatic control of the caddy's guidance system. The console 132 also includes additional electronics for the adjustment of the caddy's steering range and centering abilities. The console is powered by the tractor's battery or any available 12-volt power supply 134.

Through the console, the caddy 10 can be steered to maintain a preferred position within the rows of crop. Guidance or steering of the caddy can be either automatic or manual and adjustments can be made to optimize the range of the hydraulic cylinders 94 and 96 and to vary the angular position of the rear axle to compensate for the slope of side hills or other mechanical or environmental factors which may cause the caddy 10 to pull or drift to either side. The console 132 is operatively associated with the steering valve 128 for direct control over the hydraulic cylinders 94 and 96 in either the automatic or manual modes of operation.

The row sensor 116 and sensor wands 104 and 106 are operatively associated with console 132 with the row sensor receiving power directly from the console. During normal operations of the caddy 10, the row sensor 116 electronically senses the position of the two sensor wands 104 and 106 within the crop row and transmits that information back to the console 132. Those skilled in the art will understand that the sensor wands 104 and 106 are positioned so the rear portions of the wands engage the row of crop adjacent each wand. The wands will experience equal pressure from the adjacent rows of crop as long as the caddy 10 and the attached implement 14 are positioned with their ground-engaging attachments centered between the rows to avoid crop damage during cultivating, planting and the like. A signal is generated by the row sensor 116 and transmitted to the console 132 to indicate that the caddy and implement are properly positioned.

If the caddy 10 begins to drift from its preferred position in the crop rows during normal operation, one of the sensor wands 104, 106 will experience more pressure than the other, depending on the direction of drifting. For example, if the caddy drifts to the right, sensor 104 will engage the adjacent row of crop more solidly than sensor 106. The pressure on sensor 104 is translated into an electric signal by the row sensor 116 which is transmitted to the console 132, indicating that same correction to the caddy's path of travel is required. In the automatic mode, the console then calculates the necessary correction and sends a signal to the steering valve 128 to actuate hydraulic cylinders 94 and 96, thereby rotating the rear axle 30 around the vertical axis a—a. Rotation of the axle steers the caddy back to its preferred position between the crop rows.

The console 132 also supplies power to a second or feedback sensor 136 which monitors the angular orientation of the rear axle 30 in a known manner. The feedback sensor 136 generates a signal to indicate whether the rear axle is turned to the left or to the right. When the caddy returns to its desired position, the console 132 again signals the steering valve 128 to actuate the cylinders 94 and 96 and re-orient the rear axle 30 to its initial position transverse to the direction of travel. It will be understood that steering the caddy 10 depends on the angular orientation of the rear axle 30 with respect to the direction of travel. When the axle is rotated about its vertical axis, the caddy is steered to its new position under the guidance of the wheels 52.

The caddy 10 can be used in numerous farming or agricultural applications and is not limited to towing one type of farm implement. The caddy 10 is preferably constructed to be able to carry significant loads such as a tank for liquid fertilizer, pesticides, herbicides or the like. Additionally, the caddy 10 can tow various types of implements from various manufacturers. Cultivators, planters and the like can be towed behind the caddy 10 for precise control of implement positioning in row crop farming applications.

The caddy 10 of the present invention will significantly reduce overall equipment costs by converting mounted implements to pull-type, thereby allowing for the use of tractors of smaller size and lower horsepower in many farming applications which would otherwise require the use of larger tractors equipped with a three-point hitch assembly. For example, a 60 horsepower tractor is adequate to pull the caddy 10 and thereby to tow a 16-row cultivator. In the absence of the caddy 10, the farmer would be compelled to use a larger (175 horsepower) and more expensive tractor, equipped with a three-point hitch, to tow such a large mounted implement. Without the caddy 10, the smaller tractor (60 horsepower) would only be capable of towing a cultivator, for example, with a maximum capacity of eight rows. Regarding materials, the caddy is principally made from steel or other heavy duty materials. The hydraulic cylinders used to control the axle of the caddy are typically the standard 3 in. ×8 in. hydraulic cylinders well known to those skilled in the art.

While a preferred embodiment of the present invention has been described herein, those skilled in the art will appreciate that various changes and modifications to the features of the described embodiment can be made without departing from the true spirit and scope of the invention, as defined in the claims.

We claim:

1. A caddy adapted to be towed by a tractor and equipped to pull an agricultural implement therebehind, the caddy comprising:

attachment means for pivotally connecting the caddy to a single pivot hitch on a tractor;

an axle having wheels mounted on the ends thereof and pivotally connected to said attachment means, said ends of said axle extending laterally away from said attachment means and said axle being rotatable around a vertical axis to vary the angular orientation of said axle relative to said attachment means; and guidance means for rotating said axle around said vertical axis to steer the caddy along a desired path of travel when the caddy is towed behind a tractor, said guidance means having a pair of sensor wands extending beneath said attachment means, each of said sensor wands positioned along the circumference of a circle centered about said vertical axis.

2. The caddy of claim 1 wherein the length of said axle is adjustable, said axle including a sleeve portion and a pair of shank portions, the ends of said sleeve portion being adapted to slidably receive said shank portions therein, said axle further including locking means for reversibly locking each said shank portion within said ends of said sleeve portion.

3. The caddy of claim 1 wherein said attachment means includes an elongate tongue member, one end of said tongue member adapted for attachment to a pivot hitch on a tractor, the other end of said tongue member being pivotally attached to said axle at said vertical axis.

4. The caddy of claim 1 wherein said guidance means includes detection means for sensing the position of the caddy relative to a desired path of travel, steering means responsive to said detection means for rotating said axle about said vertical axis to steer said caddy and thereby maintain said caddy on said desired path and means to monitor and control said detection means and said steering means.

5. The caddy of claim 4 wherein said guidance means includes a pair of hydraulic cylinders, each of said cylinders affixed at one end thereof to said axle and, at the other end thereof, to said attachment means, said hydraulic cylinders being connected to a hydraulic steering valve mounted on said attachment mans and connected to a hydraulic outlet on the tractor, said steering valve actuating said hydraulic cylinders under the control of said control means.

6. The caddy of claim 5 wherein said detection means includes said pair of sensor wands, said sensor wands being responsive to pressure exerted thereon by adjacent rows of crop, said sensor wands electrically associated with a row sensor mounted on the caddy, said row sensor generating an electrical signal indicative of the relative pressure exerted on said wands, said electrical signal being transmitted to said control means to actuate said steering valve and rotate said axle about said vertical axis to steer the caddy and thereby maintain said caddy on a desired path of travel, said detection means also including a feedback sensor mounted to the caddy and electrically connected to said control means, said feedback sensor signalling to said control means the angular position of said axle and said control means actuating said steering valve to reposition said axle back in said desired path of travel.

7. A caddy adapted to be towed by a tractor and equipped to pull an agricultural implement therebehind, the caddy comprising:

attachment means for pivotally connecting the caddy to a single pivot hitch on a tractor;

an axle having wheels mounted on the ends thereof and pivotally connected to said attachment means, said ends of said axle extending laterally away from said attachment means and said axle being rotatable around a vertical axis to vary the angular orientation of said axle relative to said attachment means;

a three-point hitch affixed to said axle, said hitch being rotatable around said vertical axis with said axle; and guidance means for rotating said axle around said vertical axis to steer the caddy along a desired path of travel when the caddy is towed behind a tractor.

8. The caddy of claim 7 wherein the length of said axle is adjustable, said axle including a sleeve portion and a pair of shank portions, the ends of said sleeve portion being adapted to slidably receive said shank portions therein, said axle further including locking means for reversibly locking each said shank portion within said ends of said sleeve portion.

9. The caddy of claim 7 wherein said attachment means includes an elongate tongue member, one end of said tongue member adapted for attachment to a pivot hitch on a tractor, the other end of said tongue member being pivotally attached to said axle at said vertical axis.

10. The caddy of claim 7 said guidance means includes detection means for sensing the position of the caddy relative to a desired path of travel, steering means responsive to said detection means for rotating said axle about said vertical axis to steer said caddy and thereby maintain said caddy on said desired path and control means to monitor and control said detection means and said steering means.

11. The caddy of claim 10 said guidance means includes a pair of hydraulic cylinders, each of said cylinders affixed at one end thereof to said axle and, at the other end thereof, to said attachment means, said hydraulic cylinders being connected to a hydraulic steering valve mounted on said attachment means and connected to a hydraulic outlet on the tractor, said steering valve actuating said hydraulic cylinders under the control of said control means.

12. The caddy of claim 11 wherein said detection means includes a pair of sensor wands connected to and positioned beneath said attachment means so that the ends of each of said sensor wands are positioned along the circumference of a circle centered about said vertical axis, said sensor wands being responsive to pressure exerted thereon by adjacent rows of crop, said sensor wands electrically associated with a row sensor mounted on the caddy, said row sensor generating an electrical signal indicative of the relative pressure exerted on said wands, said electrical signal being transmitted to said control means to actuate said steering valve and rotate said axle about said vertical axis to steer the caddy and thereby maintain said caddy on a desired path of travel, said detection means also including a feedback sensor mounted to the caddy and electrically connected to said control means, said feedback sensor signalling to said control means the angular position of said rear axle and said control means actuating said steering valve to reposition said rear axle back in said desired path of travel.

13. The caddy of claim 7 wherein said three-point hitch includes laterally aligned right and left draft links and a center link mounted between and above said right and left draft links, said right and left draft links mounted along a rod positioned along the rear of said axle and rotatable around its longitudinal axis to raise and lower said right and left draft links under the control of at least one hydraulic cylinder, said cylinder connected to at least one of said right or left draft links to position said hitch between a raised and lowered position.

14. A caddy adapted to be towed by a tractor and equipped to pull an agricultural implement therebehind, the caddy comprising:

a tongue member having a first and second end thereon, said first end adapted for attachment to a pivot hitch on a tractor;

an axle having wheels mounted on the ends thereof and pivotally attached to said second end of said tongue member, said wheels positioned laterally with respect to said tongue member, said axle being rotatable around a vertical axis to vary the angular orientation of said axle relative to said tongue member;

a frame assembly affixed to said axle and extending beneath said tongue member between said axle and said first end of said tongue member;

a three-point hitch affixed to said axle for towing an agricultural implement, said hitch being rotatable around said vertical axis with said axle; and guidance means for automatically rotating said axle around said vertical axis to steer the caddy along a desired path of travel when towed behind a tractor.

15. The caddy of claim 14 wherein said tongue member includes at least two portions, a first portion having said first end thereon and extending from said first end toward said frame assembly at an upward inclination, a second portion attached to said first portion and extending horizontally over said frame assembly, said second portion having said second end thereon, said second end adapted to receive a pivot pin therein to form said vertical axis.

16. The caddy of claim 15 wherein said frame assembly extends underneath and parallel to said second portion of said tongue member, said frame assembly including a pair of side members attached to said axle, said side members parallel to each other and perpendicular to said axle, and a pair of cross members attached to and extending between said cross members.

17. The caddy of claim 14 wherein said three-point hitch includes laterally aligned right and left draft links and a center link mounted between and above said right and left draft links, said right and left draft links mounted along a rod positioned along the rear of said axle and rotatable around its longitudinal axis to raise and lower said right and left draft links under the control of at least one hydraulic cylinder, said cylinder connected to said frame assembly and at least one of said right or left draft links to position said hitch between a raised and lowered position.

18. The caddy of claim 14 wherein said guidance means includes detection means for sensing the position of the caddy relative to a desired path of travel, steering means responsive to said detection means for rotating said axle about said vertical axis to steer said caddy and thereby maintain said caddy on said desired path and control means to monitor and control said detection means and said steering means.

19. The caddy of claim 18 wherein said guidance means includes a pair of hydraulic cylinders, each of said cylinders affixed at one end thereof to said axle and at the other end thereof to said tongue member said hydraulic cylinders being connected to a hydraulic steering valve mounted on said tongue member and connected to a hydraulic outlet on the tractor, said steering valve actuating said hydraulic cylinders under the control of said control means.

20. The caddy of claim 19 wherein said detection means includes a pair of sensor wands connected to and positioned beneath said frame assembly so that the ends of each of said sensor wands are positioned along the circumference of a circle centered about said vertical axis, said sensor wands being responsive to pressure exerted thereon by adjacent rows of crop, said sensor wands electrically associated with a row sensor mounted on said frame assembly, said row sensor generating an electrical signal indicative of the relative pressure exerted on said wands, said electrical signal being transmitted to said control means to actuate said steering valve and rotate said axle about said vertical axis to steer the caddy and thereby maintain said caddy on a desired path of travel, said detection means also including a feedback sensor mounted to said frame assembly and electrically connected to said control means, said feedback sensor signalling to said control means the angular position of said axle and said control means actuating said steering valve to reposition said axle back in said desired path of travel.

* * * * *